United States Patent
Hsu (10) Patent No.: US 12,386,695 B2
(45) Date of Patent: Aug. 12, 2025

(54) METHOD FOR SCANNING BAD BLOCK OF MEMORY AND CIRCUIT SYSTEM THEREOF

(71) Applicant: REALTEK SEMICONDUCTOR CORP., Hsinchu (TW)

(72) Inventor: Fu-Ching Hsu, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 171 days.

(21) Appl. No.: 18/087,929

(22) Filed: Dec. 23, 2022

(65) Prior Publication Data
US 2023/0205623 A1 Jun. 29, 2023

(30) Foreign Application Priority Data
Dec. 29, 2021 (TW) .................. 110149250

(51) Int. Cl.
G06F 11/10 (2006.01)
G06F 11/07 (2006.01)

(52) U.S. Cl.
CPC ...... *G06F 11/1004* (2013.01); *G06F 11/0772* (2013.01); *G06F 11/0793* (2013.01)

(58) Field of Classification Search
CPC ............. G06F 11/1004; G06F 11/0772; G06F 11/0793
USPC .................................................. 714/763, 764
See application file for complete search history.

(56) References Cited

U.S. PATENT DOCUMENTS

| | | | | |
|---|---|---|---|---|
| 2009/0327822 A1* | 12/2009 | Kameda | .............. | G06F 11/1068 714/E11.02 |
| 2010/0180182 A1* | 7/2010 | Trantham | ............ | G06F 11/1008 714/799 |
| 2011/0035538 A1* | 2/2011 | Kim | ........................ | G11C 16/10 711/E12.001 |
| 2012/0272114 A1* | 10/2012 | Cho | ...................... | H04L 1/1607 714/E11.131 |
| 2013/0080858 A1* | 3/2013 | Lee | ...................... | G11C 11/5642 714/E11.054 |
| 2016/0342332 A1* | 11/2016 | Kang | .................. | G06F 12/0238 |
| 2021/0090643 A1* | 3/2021 | Takeda | ................... | G11C 16/26 |
| 2021/0181985 A1* | 6/2021 | Shin | ...................... | G06F 3/0659 |
| 2021/0279132 A1* | 9/2021 | Kim | ................... | G11C 16/3495 |
| 2021/0382655 A1* | 12/2021 | Yang | ...................... | G06F 3/0679 |
| 2022/0093191 A1* | 3/2022 | Yang | .................... | G11C 29/028 |

* cited by examiner

*Primary Examiner* — Albert Decady
*Assistant Examiner* — Osman M Alshack
(74) *Attorney, Agent, or Firm* — Li & Cai Intellectual Property (USA) Office (57) ABSTRACT

A method for scanning bad block of a memory and a circuit system thereof are provided. In a procedure of scanning bad blocks of the memory, the circuit system uses a cache read command that is adapted to a process of continuously reading a plurality of memory pages of the memory. The cache read command loads a memory page data to a cache of the memory in advance, and then reads the memory page data from the cache at a next instruction cycle. Next, the cache read command loads a next memory page data to the cache. These steps are repeated until the procedure of scanning bad blocks of the memory is completed. The method can effectively reduce the time for the memory to prepare the next page data so as to reduce the impact of the busy time of the memory on time performance.

20 Claims, 5 Drawing Sheets

METHOD FOR SCANNING BAD BLOCK OF MEMORY AND CIRCUIT SYSTEM THEREOF

CROSS-REFERENCE TO RELATED PATENT APPLICATION

This application claims the benefit of priority to Taiwan Patent Application No. 110149250, filed on Dec. 29, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure is related to a method for scanning bad blocks of a memory, and more particularly to a method for scanning bad blocks in the memory by modifying a read command for effectively reducing scanning time of the bad blocks, and a circuit system thereof.

BACKGROUND OF THE DISCLOSURE

A non-volatile flash memory can be classified into an NAND flash memory and an NOR flash memory.

In an electronic device, when a controller IC of the NAND flash memory is powered on for a first time, it is required to scan the NAND memory so as to determine bad blocks of the NAND memory first, and then create a bad block table before continuing to perform the subsequent booting procedure. However, creating the bad block table takes some time, since the whole data is required to be read out from the flash memory. Two procedures of improvement are provided as follows for improving the drawbacks of the conventional technology.

One of the procedures of improvement is to quickly determine the good blocks and the bad blocks through a pipeline mechanism after reading the data from the flash memory. Since an error correction code (ECC) circuit will spend a long time to determine the good blocks and bad blocks if any bit error is found, a pipeline mechanism is introduced in hardware to prevent the data in the flash memory from being congested in a procedure of error correction.

One further procedure of improvement is to rapidly read out data from the flash memory, and the rate to read the data depends on how fast the flash memory controller can send the flash command. In general, a way to accelerate the rate of reading data from the flash memory is to reduce the processing time of a processor. For example, the rate of reading can be accelerated when the hardware can automatically process the reading procedure, or the impact of a read busy time of the flash memory can be reduced. It should be noted that, after a read page command is sent, a certain period of time such as the read busy time needs to be elapsed before the data is read out from the flash memory.

According to the conventional method of processing the bad blocks in the flash memory of an electronic device, for scanning the bad blocks of the memory, there is no other effective way to shorten the scanning time except through hardware acceleration.

SUMMARY OF THE DISCLOSURE

In view of the shortcoming of the conventional technology that lacks a solution to effectively shorten the time for scanning bad blocks of a flash memory in addition to hardware acceleration, the present disclosure provides a method for scanning bad blocks of a memory and a circuit system of the method that use a different flash read command for effectively minimizing impact of a read busy time. Further, the circuit system has a hardware design without a processor, i.e., CPU, and therefore the time to scan the bad blocks can be effectively reduced.

According to one embodiment of the present disclosure, the method for scanning bad blocks of the memory is operated in a control circuit of the memory. In the main steps of the method, the control circuit issues a cache read command to the memory and drives the memory to enter a memory busy time. In the meantime, a memory page data is preloaded to a cache of the memory. When the cache read command is executed to read the memory page data from the cache, the control circuit issues a next cache read command to the memory for preloading a next memory page data to the cache at another memory busy time. Thus, the above steps are repeated until the procedure for scanning the bad blocks of the memory is completed.

Further, before the method for scanning bad blocks of the memory is performed, the control circuit sets up a starting address of one of the memory pages of the memory, a size of each of the memory pages, and a size of a memory block of the memory. In the method, before the control circuit issues the cache read command to the memory, the control circuit issues a page read command to the memory for reading a first memory page data.

Preferably, the control circuit obtains the memory page data by an error correction code circuit. The error correction code circuit determines if any bad block is present according to an error correction code that is written into each of the memory pages of the memory. When any bad block of the memory is scanned, the control circuit creates a bad block table according to an address of the bad block.

In one aspect of the method of the present disclosure, the circuit system includes a control circuit that includes an error correction code circuit and a register. The control circuit is connected with the memory in order to operate the method for scanning bad blocks of the memory.

In the method operated by the control circuit, the control circuit issues a page read command according to an address and a size of a first memory page, and the control circuit enters a memory busy time corresponding to the page read command, such that the memory prepares data. Next, the control circuit issues an $N^{th}$ cache read command, enters an $N^{th}$ memory busy time, and preloads an $N^{th}$ memory page data to a cache of the memory. N is an integer equal to or larger than 1. Afterwards, the page read command is executed so as to read a first memory page data according to a starting address of the first memory page. The control circuit then issues an $(N+1)^{th}$ cache read command, enters an $(N+1)^{th}$ memory busy time, and preloads an $(N+1)^{th}$ memory page data to the cache of the memory. Next, the $N^{th}$ cache read command is executed so as to read the $N^{th}$ page data from the cache. After the steps are completed, let N=N+1 and the above steps are repeated until the procedure for scanning bad blocks of the memory is completed.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

After an electronic device is powered on, a system operated in the device performs a procedure of scanning bad blocks of a memory of the device. The electronic device is such as a computer system or any device that adopts a flash memory. The memory to be scanned in the booting procedure can be a NAND flash memory. The procedure is used to identify the bad blocks formed in a production process of the memory, or the bad blocks formed with the increase in the number of reading, writing and erasing operations. A bad block table based on the bad blocks to be identified can be created. The bad block table is used as a reference to be queried for avoiding the bad blocks when the electronic device is in operation and accesses the memory. However, the system takes time for scanning the bad blocks, in addition to hardware acceleration, provided in the present disclosure is to a method and a system for scanning bad blocks of the memory by using a modified flash read command. The method can effectively minimize an impact of the read busy time when the memory is scanned so as to reduce the time to scan the bad blocks. It should be noted that, hardware such as a processor (e.g., CPU) does not intervene in the scanning procedure.

Figure 1:
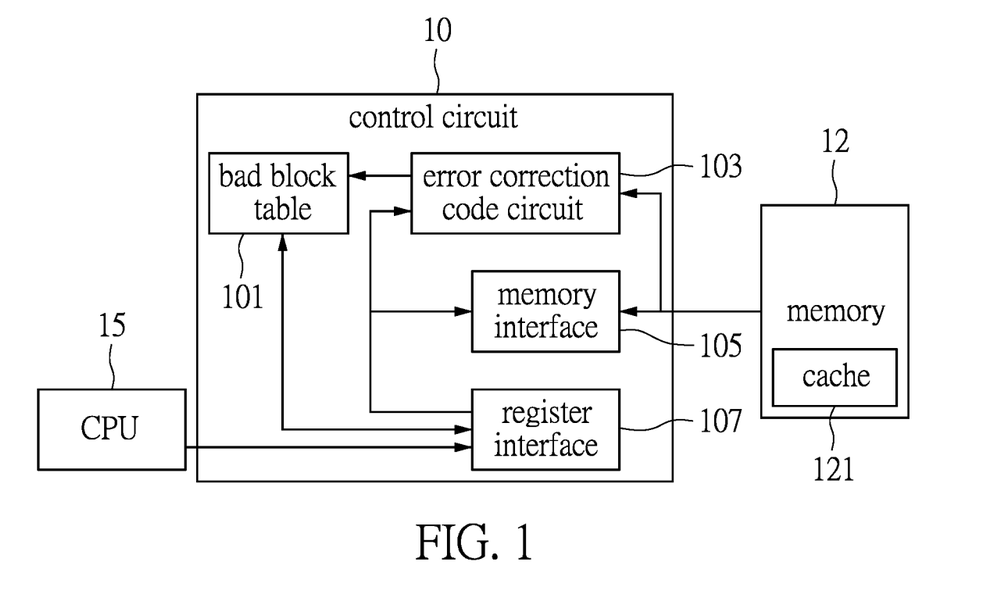
FIG. 1 is a schematic diagram depicting a system framework of a circuit system according to one embodiment of the present disclosure.

FIG. 1 is a schematic diagram depicting a system framework of a circuit system according to one embodiment of the present disclosure. The circuit system can be applied to an electronic device, and the circuit system mainly includes a memory 12 and a control circuit 10 of the memory 12. The memory 12 can be a NAND flash memory.

The memory 12 can be composed of multiple flash memory units. With the NAND flash memory as an example, one flash memory unit can be composed of multiple memory blocks, e.g., 4096 blocks. One memory block can be composed of multiple memory pages. It should be noted that 1 block equals to 128 memory pages. The memory page is a basic storage unit, in which the memory is read or written in a unit of one memory page. The one memory page can be subdivided into multiple sectors. Further, the memory 12 has a cache 121 that is used to buffer the data prepared to be read by a cache read command issued by the control circuit 10.

The control circuit 10 includes several hardware-implemented circuit units. A register interface 107 is connected with registers of the control circuit 10. The registers can be used to record a bad block table 101, and can also be used to record access information such as an address of each of the memory pages, a number of the memory pages and the blocks of the memory 12 that is connected with the control circuit 10.

The control circuit 10 is connected with the memory 12 via a memory interface 105, by which the control circuit 10 sends a memory control command to the memory 12. An error correction code circuit 103 is configured to obtain the information of the memory 12, and send the information of the bad blocks from scanning to the bad block table 101 for updating the content therein. The bad block table 101 correspondingly records the sizes of the bad blocks and the memory pages thereof, and also records the result processed by the error correction code circuit 103.

Figure 2:
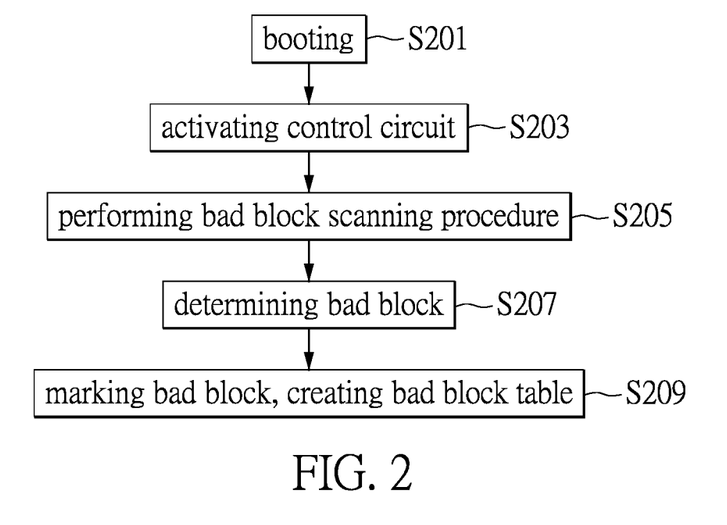
FIG. 2 is a flowchart that describes a procedure performed by the circuit system for scanning bad blocks of a memory according to one embodiment of the present disclosure.

Reference is made to FIG. 2, which is a flowchart describing the procedure of scanning the bad blocks performed by the circuit system according to one embodiment of the present disclosure. When an electronic device is powered on (step S201), a central processing unit (i.e., CPU) of the electronic device controls a register circuit to activate the control circuit 10 of the memory by establishing a connection with the register interface 107 of the control circuit 10 (step S203). The central processing unit firstly reads the bad block table 101 recorded in the registers of the control circuit 10, and is prepared to read the data in the memory 12.

The procedure of scanning the bad blocks is required especially when the electronic device is powered on for a first time (step S205). In one aspect, a firmware of the control circuit 10 is configured to sequentially perform writing and reading operations to the memory blocks of the memory 12. The error correction code circuit 103 determines whether each block is a good block or a bad block according to the data sequentially read from the memory 12 (step S207). It should be noted that the error correction code circuit 103 relies on the error correction codes (ECC) to be written to every memory page of the memory 12 to determine whether or not the memory includes the bad blocks. Further, when the circuit system is in a normal operation, the NAND flash memory may cause bit errors in the data after the memory is operated for a period of time. The control circuit 10 bears a certain fault tolerance since the error correction code circuit 103 in the control circuit 10 can perform a bit error correction that has a certain capability.

For example, the control circuit 10 includes a 6-bit error correction code circuit 103, and the size of one sector of the memory 12 is 512 bytes. Accordingly, one sector of the memory 12 requires 10 bytes of error correction codes (ECC). When 512 bytes and 10 bytes of data are read from the memory 12, the sector will be determined as a good sector if there are no more than 6 error bits. It should be noted that the 512 bytes are the data amount read from the memory 12, and the additional 10 bytes are the data amount produced in the operation of the bit error correction.

In the procedure of scanning the bad blocks, the control circuit 10 marks the addresses of the bad blocks by the registers if the bad blocks are determined to be present. The marked addresses of the bad blocks form the bad block table 101 (step S209). Further, in one aspect of the present disclosure, the bad block table 101 is used to record address ranges of the bad blocks of the memory for marking the bad blocks that cannot be used. Therefore, when the central processing unit 15 accesses the memory 12, the control circuit 10 prevents the data to be written to the bad blocks by referring to the bad block table 101.

It should be noted that a read busy time occurs when the procedure of scanning the bad blocks of the memory is configured to read the data of every memory page. For minimizing the impact of the read busy time, a flash read command is modified in the method for scanning the bad blocks of the memory in the present disclosure. The concept of the method is to automatically preload a next memory page data when a current memory page data is read by a cache read command in the procedure of page-by-page reading data from the memory 12, thereby effectively minimizing the impact of the read busy time.

Figure 3:
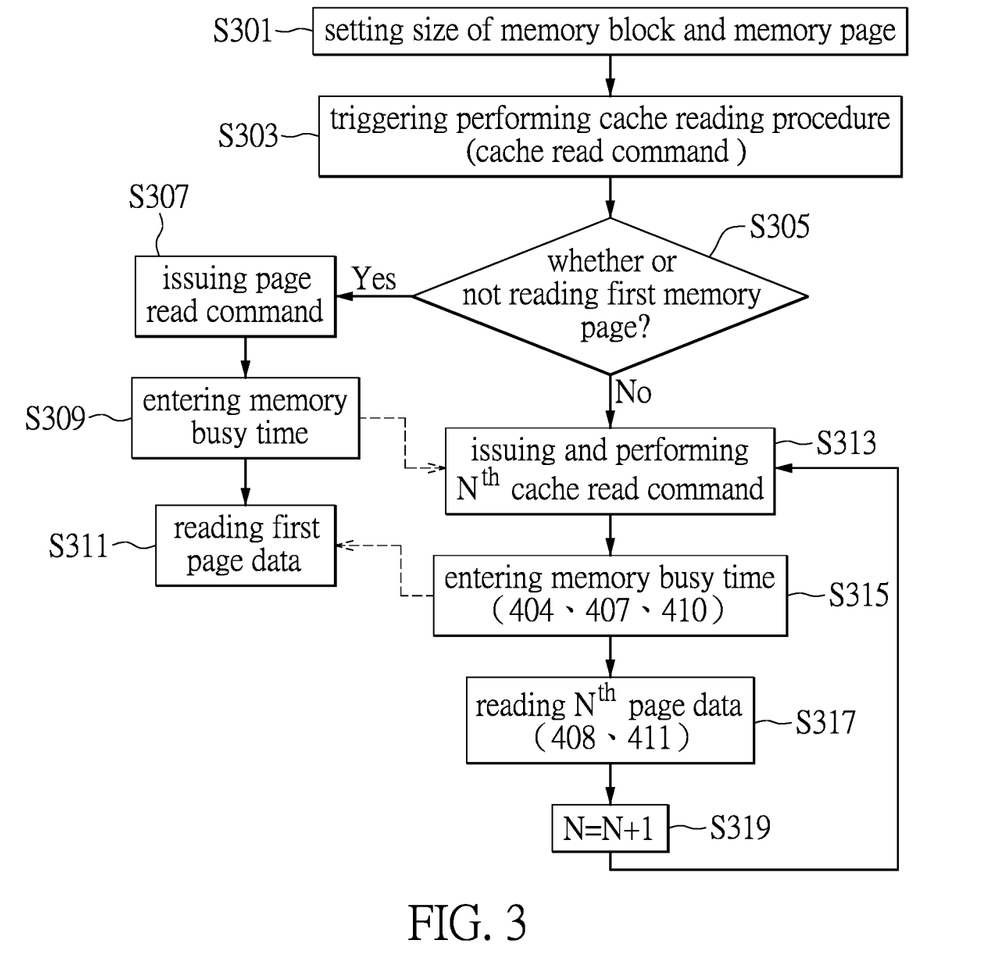
FIG. 3 is a flowchart that describes the method for scanning bad blocks of the memory according to one embodiment of the present disclosure.

According to one embodiment of the present disclosure, reference is made to FIG. 3, which is a flowchart describing the method for scanning bad blocks of the memory performed in the control circuit of the memory.

In the main technical means of the procedure, in addition to using the page read command to read a first memory page data, the control circuit 10 continuously performs the procedure of scanning the bad blocks of the memory 12 via the cache read command That is, the control circuit 10 issues the cache read command to the memory 12 for prompting the memory 12 to enter a memory busy time for preloading a memory page data to the cache of the memory 12. The above-mentioned cache read command can be indicative of an $N^{th}$ cache read command, the memory busy time can be indicative of an $N^{th}$ memory busy time, and the memory page data is indicative of an $N^{th}$ memory page data recited in a following example.

When the memory page data is preloaded to the cache of the memory 12 and the cache read command is performed to read the memory page data from the cache, the control circuit issues a next cache read command, which can be indicative of an $(N+1)^{th}$ cache read command recited in the following example. At another memory busy time such as an $(N+1)^{th}$ memory busy time, a next memory page data indicative of an $(N+1)^{th}$ memory page data in the following example is loaded to the cache of the memory 12. The above steps are repeated until the procedure of scanning the bad blocks of the memory 12 is completed.

Figure 4:
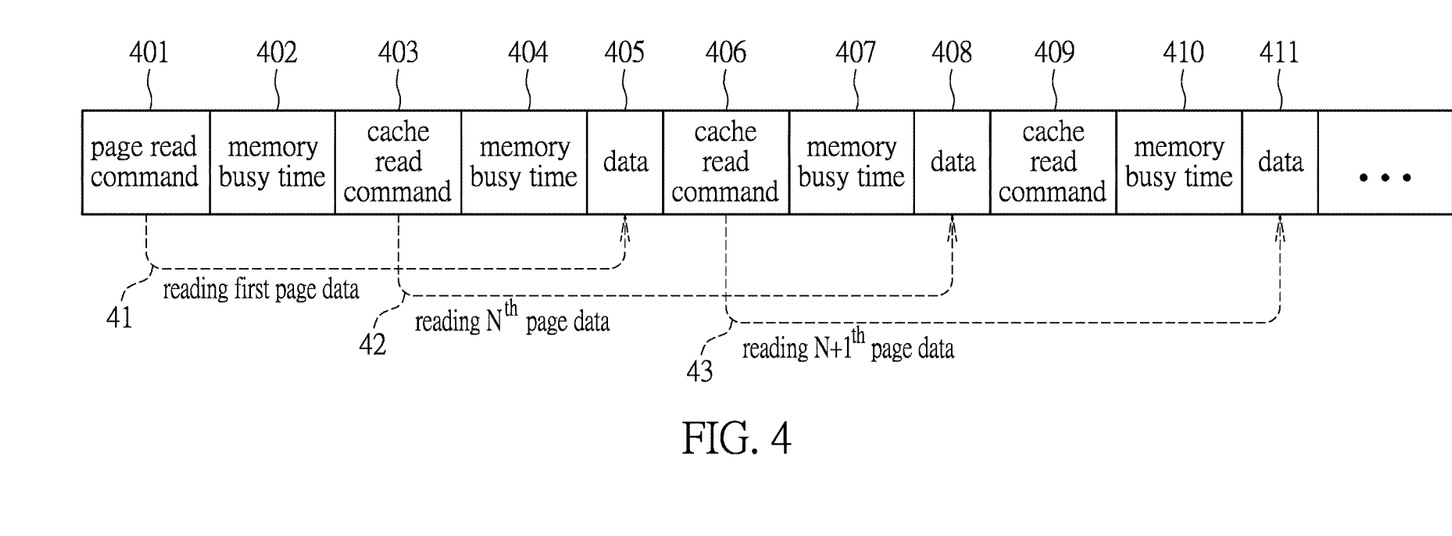
FIG. 4 is a timing diagram when performing the method for scanning bad blocks of the memory according to one embodiment of the present disclosure.

References are made to FIG. 3, which is a flowchart describing the method for scanning bad blocks of the memory, and FIG. 4, which shows a timing diagram when performing the method in one embodiment of the present disclosure. In one aspect, the circuit system creates a bad block table after the procedure of scanning the bad blocks of the memory, or, in another aspect, the circuit system preloads the bad block table which has been created and can be updated when addresses of a new bad block are obtained.

In FIG. 3, in the beginning as step S301, a central processing unit of an electronic device activates the control circuit of the memory when the electronic device is powered on. The control circuit performs the procedure of scanning the bad blocks of the memory. The control circuit sets up the sizes of both the memory block and the memory page and a starting address of each of the memory pages by means of using firmware. The setting allows the control circuit to perform the procedure of automatically scanning the bad blocks of the memory until the procedure is completed.

In step S303, the central processing unit of the electronic device that adopts the circuit system triggers an automatic cache reading procedure. In the procedure of scanning bad blocks of the memory, such as in step S305, the control circuit determines whether or not it currently reads the first memory page data. If the control circuit determine that it reads the first memory page data, which indicates that the procedure of scanning the bad blocks of the memory has started, such as in step S307, the control circuit issues a page read command to the memory via the memory interface according to an address and a size of the first memory page. In the timing diagram shown in FIG. 4, a page read command 401 includes a starting address of the first memory page. Next, such as in step S309, the memory is driven to a busy time, such as a memory busy time 402 as shown in FIG. 4. The memory busy time 402 is configured to allow the memory to prepare reading the data.

It should be noted that, such as in step S311, the page read command is performed for reading the first memory page data, such as the data 405 shown in FIG. 4, and a path 41 shows the step of reading the first memory page data. In one of the embodiments of the present disclosure, before the first memory page data is read, the control circuit issues a cache read command to the memory via a memory interface for preloading the next memory page to the cache of the memory so as to reduce the time for the memory to prepare the next data compared to only prepare the next data when a next read command is received.

Alternatively, in the abovementioned step S305, if the control circuit determines that it currently does not read the first memory page data, in step S313, the control circuit issues an $N^{th}$ cache read command such as the cache read commands 403, 406 and 409 shown in FIG. 4. It should be noted that N equals to 1 for the $N^{th}$ cache read command if this cache read command is issued after issuing the page read command Next, such as in step S315, the memory enters $N^{th}$ memory busy time, such as the memory busy times 404, 407 and 410 shown in FIG. 4, that provides a time allowing the memory to prepare reading the data. In the meantime, the corresponding $N^{th}$ memory page data is preloaded to the cache of the memory for allowing the control circuit to read the $N^{th}$ memory page data from the cache in step S317, such as the data 408 and 411 shown in FIG. 4. In FIG. 4, a path 42 indicates the step of reading the $N^{th}$ memory page data, and a path 43 indicates the step of reading the $(N+1)^{th}$ memory page data. N is an integer larger than 1.

The control circuit performs a firmware procedure that sets N to be equal to N+1 (step S319), and enters a next instruction cycle for returning the procedure to step S313. The control circuit then issues an $(N+1)^{th}$ cache read command for driving the memory to enter an $(N+1)^{th}$ memory busy time and to cache an $(N+1)^{th}$ memory page data in order to preload the $(N+1)^{th}$ memory page data to the cache of the memory (step S315). Therefore, such as in step S317, the $(N+1)^{th}$ memory page data can be read. In step S319, the control circuit continues to perform the subsequent procedure for reading the further memory page data. Steps S313 to S319 will be repeated until the whole memory is scanned.

According to the above steps in the method for scanning the bad blocks of the memory in accordance with the present disclosure, for minimizing the impact of the memory busy time, in addition to reading the first memory page data from the memory by the page read command, an additional cache read command is used to read the subsequent memory page data, in which the next memory page data is preloaded to the cache of the memory for reducing the time for the memory to prepare the next memory page data after receiving the read command. In the above steps, when the $N^{th}$ cache read command is issued, the memory enters the $N^{th}$ memory busy time and caches the $N^{th}$ memory page data from the memory. Before the $N^{th}$ cache read command is performed for reading the $N^{th}$ memory page data, the next cache read command, i.e., the $(N+1)^{th}$ cache read command, is issued in order to prompt the memory to enter the $(N+1)^{th}$ memory busy time for caching the $(N+1)^{th}$ memory page data from the memory. After that, the previous $N^{th}$ cache read command is performed for reading the $N^{th}$ memory page data. As mentioned above, the procedure is adapted to an application that requires continuously reading the memory page data. After repeating the steps S313 to S319, the procedure of scanning bad blocks of the memory can be accelerated. In particular, the procedure can read the whole memory data by only requiring setting up the starting address of the memory page and the sizes of the memory blocks and memory pages. The hardware acceleration can be achieved since the procedure does not require the central processing unit of the electronic device to intervene.

Therefore, the method can effectively minimize the impact of the memory busy time that is used to prepare the data to be read on an overall time performance when the procedure introduces the cache read command to preload the next memory page data to the cache of the memory for reducing the time to prepare the next memory page data.

Figure 5:
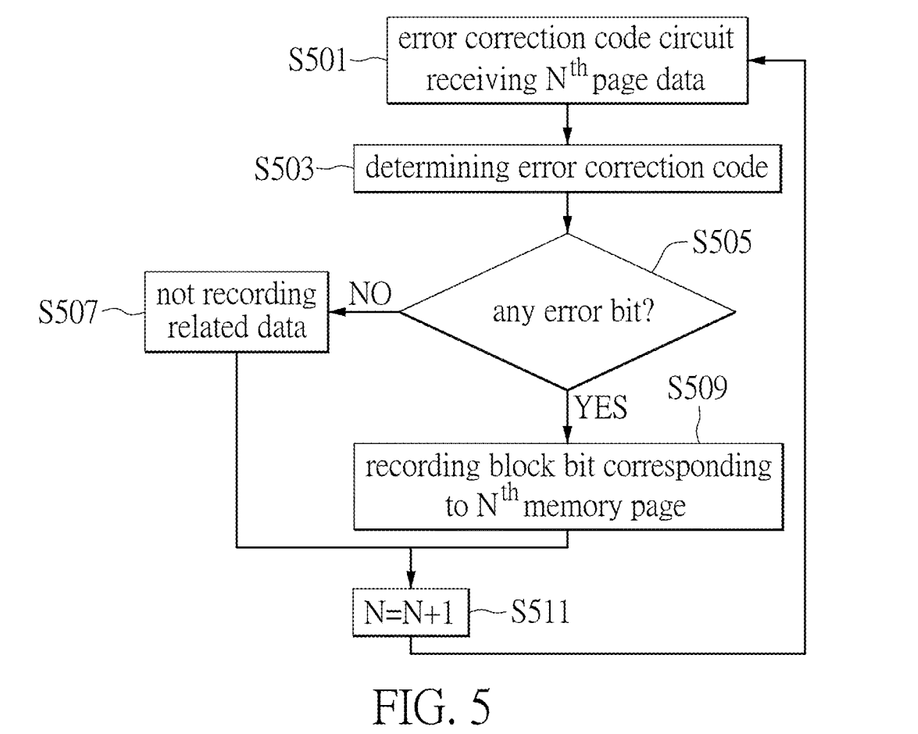
FIG. 5 is a flowchart describing a process for creating a bad block table according to one embodiment of the present disclosure.

FIG. 5 is a flowchart describing a process for creating the bad block table according to one embodiment of the present disclosure. When the control circuit starts to scan the bad blocks of the memory, such as in step S501, the error correction code circuit reads the memory page data through a page read command or a cache read command. The memory page data is such as the $N^{th}$ memory page data, in which N equals to 1 or other positive integers. In the meantime, such as in step S503, according to the error correction code written in every memory page of the memory, the error correction code circuit determines whether or not any bad block is present. In step S505, the procedure determines whether or not any error bit is found.

If the error correction code circuit determines that the $N^{th}$ memory page has no error bit, such as in step S507, the control circuit will not record this page. On the other hand, if the data is inconsistent with the error correction code read from the memory page, such as in step S509, the error correction code circuit performs error bit correction so as to determine whether or not there is any irreparable memory page that is marked as a bad block. The block bits relevant to the $N^{th}$ memory page are then used to create the bad block table. Next, the control circuit lets N to be equal to N+1 (step S511), and performs the next bad block scan on the next memory page until the whole memory is scanned.

In summation, according to the above embodiments of the method for scanning bad blocks of the memory and the circuit system thereof, the concept of the invention is to add a cache read command into the procedure of scanning the bad blocks of the memory in addition to the original page read command. The cache read command allows the procedure to preload a next memory page data to the cache of the memory. The cache read command is applicable to the application that requires reading memory pages continuously for effectively reducing the time to prepare the next memory page data. Therefore, the impact of the memory busy time can be minimized for improving the time performance when scanning the bad blocks. In particular, the procedure does not require the processor to intervene.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for scanning bad blocks of a memory, operated in a control circuit of the memory, wherein the memory comprises multiple flash memory units, one flash memory unit comprises multiple memory blocks, one memory block comprises multiple memory pages, and the memory comprises a cache used to buffer data to be read by a cache read command issued by the control circuit, wherein the method comprises:

activating the control circuit to read a bad block table stored in a register of the control circuit and ready to read the data in the memory;

the control circuit being configured to sequentially perform writing and reading operations to each of the memory blocks of the memory, and an error correction code circuit being configured to determine whether each of the memory blocks is a good block or a bad block according to the data sequentially read from the memory by performing steps comprising:

step a: the control circuit issuing the cache read command to the memory so that the memory enters a memory busy time, and preloading data in a memory page data to the cache of the memory;

step b: when the cache read command is executed to read the memory page data in the cache, the control circuit issues a next cache read command to the memory and preloads a next memory page data to the cache of the memory at another memory busy time; and step c: repeating the step a and the step b until a procedure of scanning bad blocks of the memory is completed.

2. The method according to claim 1, wherein, when any bad block of the memory is scanned, the control circuit creates the bad block table according to an address of the bad block.

3. The method according to claim 1, wherein, before the control circuit issues the cache read command to the memory, the control circuit issues a page read command to the memory for reading a first memory page data.

4. The method according to claim 3, wherein, when any bad block of the memory is scanned, the control circuit creates the bad block table according to an address of the bad block.

5. The method according to claim 3, wherein the control circuit issues the page read command and the cache read command to the memory via a memory interface.

6. The method according to claim 3, wherein, before the method for scanning bad blocks of the memory is performed, the control circuit sets up a starting address of one of memory pages of the memory, a size of each of the memory pages, and a size of a memory block of the memory.

7. The method according to claim 6, wherein, when any bad block of the memory is scanned, the control circuit creates the bad block table according to an address of the bad block.

8. The method according to claim 7, wherein, after the error correction code circuit of the control circuit obtains the memory page data, the error correction code circuit determines if any bad block is present according to an error correction code that is written into each of the memory pages of the memory.

9. A method for scanning bad blocks of a memory, operated in a control circuit of a memory, wherein the memory comprises multiple flash memory units, one flash memory unit comprises multiple memory blocks, one memory block comprises multiple memory pages, and the memory comprises a cache used to buffer data to be read by a cache read command issued by the control circuit, wherein the method comprises:

activating the control circuit to read a bad block table stored in a register of the control circuit and ready to read the data in the memory;

the control circuit being configured to sequentially perform writing and reading operations to each of the memory blocks of the memory, and an error correction code circuit being configured to determine whether each of the memory blocks is a good block or a bad block according to the data sequentially read from the memory by performing steps comprising:

step a: issuing a page read command according to an address and a size of a first memory page and entering a memory busy time that corresponds to the page read command such that the memory prepares data, wherein the page read command records a starting address of the first memory page;

step b: issuing an $N^{th}$ cache read command, entering an $N^{th}$ memory busy time, and preloading an $N^{th}$ memory page data to the cache of the memory, wherein N is an integer equal to or larger than 1;

step c: executing the page read command and reading the first memory page data according to the starting address of the first memory page;

step d: issuing a $(N+1)^{th}$ cache read command, entering a $(N+1)^{th}$ memory busy time, and preloading a $(N+1)^{th}$ memory page data to the cache of the memory;

step e: executing the $N^{th}$ cache read command for reading the $N^{th}$ memory page data from the cache; and step f: letting N=N+1 and repeating the step d to the step f until a procedure of scanning bad blocks of the memory is completed.

10. The method according to claim 9, wherein, when any bad block of the memory is scanned, the control circuit creates the bad block table according to an address of the bad block.

11. The method according to claim 9, wherein, before the method for scanning bad blocks of the memory is performed, the control circuit sets up a starting address of one of memory pages of the memory, a size of each of the memory pages, and a size of a memory block of the memory.

12. The method according to claim 11, wherein, when any bad block of the memory is scanned, the control circuit creates the bad block table according to an address of the bad block.

13. The method according to claim 9, wherein the control circuit issues the page read command and the cache read command to the memory via a memory interface.

14. The method according to claim 13, wherein, when any bad block of the memory is scanned, the control circuit creates the bad block table according to an address of the bad block.

15. The method according to claim 14, wherein, after the error correction code circuit of the control circuit obtains the memory page data, the error correction code circuit determines if any bad block is present according to an error correction code that is written into each of the memory pages of the memory.

16. A circuit system, comprising:

a control circuit including an error correction code circuit and a register, and connected with a memory for operating a method for scanning bad blocks of the memory, wherein the memory comprises multiple flash memory units, one flash memory unit comprises multiple memory blocks, one memory block comprises multiple memory pages, and the memory comprises a cache used to buffer data to be read by a cache read command issued by the control circuit;

wherein the method includes:

activating the control circuit to read a bad block table stored in the register of the control circuit and ready to read the data in the memory;

the control circuit being configured to sequentially perform writing and reading operations to each of the memory blocks of the memory, and the error correction code circuit being configured to determine whether each of the memory blocks is a good block or a bad block according to the data sequentially read from the memory by performing steps comprising:

step a: the control circuit issuing the cache read command to the memory so that the memory enters a memory busy time, and preloading data in a memory page data to the cache of the memory;

step b: when the cache read command is executed to read the memory page data in the cache, the control circuit issues a next cache read command to the memory and preloads a next memory page data to the cache of the memory at another memory busy time; and step c: repeating the step a and the step b until a procedure of scanning bad blocks of the memory is completed.

17. The circuit system according to claim 16, wherein, after the error correction code circuit of the control circuit obtains the memory page data, the error correction code circuit determines if any bad block is present according to an error correction code that is written into each of the memory pages of the memory, wherein, when any bad block of the memory is scanned, the control circuit creates the bad block table according to an address of the bad block.

18. The circuit system according to claim 16, wherein, before the control circuit issues the cache read command to the memory, the control circuit issues a page read command to the memory for reading a first memory page data.

19. The circuit system according to claim 18, wherein the control circuit issues the page read command and the cache read command to the memory via a memory interface.

20. The circuit system according to claim 19, wherein, after the error correction code circuit of the control circuit obtains the memory page data, the error correction code circuit determines if any bad block is present according to an error correction code that is written into each of the memory pages of the memory, wherein, when any bad block of the memory is scanned, the control circuit creates the bad block table according to an address of the bad block.

* * * * *